(12) United States Patent
Ott et al.

(10) Patent No.: US 8,807,658 B2
(45) Date of Patent: Aug. 19, 2014

(54) VEHICLE SEAT WITH A VERTICALLY ADJUSTABLE SEAT BELT

(75) Inventors: Richard Ott, Kuemmersbruck (DE);
Markus Haner, Rothenstadt (DE);
Andreas Poehlmann, Hirschau (DE)

(73) Assignee: Grammer AG (DE)

( * ) Notice: Subject to any disclaimer, the term of this patent is extended or adjusted under 35 U.S.C. 154(b) by 229 days.

(21) Appl. No.: 12/859,045

(22) Filed: Aug. 18, 2010

(65) Prior Publication Data

US 2011/0062765 A1 Mar. 17, 2011

(30) Foreign Application Priority Data

Aug. 20, 2009 (DE) .......................... 10 2009 037 994

(51) Int. Cl.
*B60R 22/20* (2006.01)
*B60R 22/26* (2006.01)

(52) U.S. Cl.
USPC .......................................... 297/483

(58) Field of Classification Search
USPC .......................................... 297/468, 483, 484
See application file for complete search history.

(56) References Cited

U.S. PATENT DOCUMENTS

| | | | |
|---|---|---|---|
| 4,884,825 A | 12/1989 | Grunewald et al. | |
| 5,658,048 A | 8/1997 | Nemoto | |
| 5,722,731 A * | 3/1998 | Chang | 297/473 |
| 6,290,299 B1 * | 9/2001 | Frisch et al. | 297/410 |
| 7,367,630 B2 * | 5/2008 | Becker et al. | 297/468 |
| 7,980,635 B2 * | 7/2011 | Matsushita | 297/483 |
| 2008/0211287 A1 * | 9/2008 | Lamparter et al. | 297/468 |
| 2009/0322141 A1 * | 12/2009 | Matsushita | 297/483 |

FOREIGN PATENT DOCUMENTS

| | | |
|---|---|---|
| DE | 3406047 A1 | 2/1985 |
| DE | 3426207 A1 | 3/1986 |
| DE | 3426207 A1 | 3/1986 |
| DE | 8913309 | 4/1990 |
| DE | 4211471 A1 | 10/1992 |
| DE | 19717666 A1 | 10/1998 |
| DE | 19752059 A1 | 5/1999 |
| DE | 10302942 A1 | 8/2004 |

(Continued)

OTHER PUBLICATIONS

Office Action of German Patent and Trade Mark Office regarding German patent application No. 102009037994.0 from which priority is claimed, dated Mar. 19, 2010.

*Primary Examiner* — David R Dunn
*Assistant Examiner* — Timothy J Brindley
(74) *Attorney, Agent, or Firm* — Sheridan Ross P.C.

(57) ABSTRACT

A vehicle seat (10) is provided having a vertically adjustable seat belt in order to secure a user of the vehicle seat (10). The vehicle seat (10) comprises a portion (20) for receiving a first end (33) of the seat belt (30). In this case the vehicle seat portion (20) comprises a cover (21) which covers the vehicle seat portion (20) towards the vehicle seat (10) and behind which are provided a first slot opening (22) for passing the seat belt (30) out of the interior of the vehicle seat portion (20) towards the exterior of the vehicle seat portion (20) and a second slot opening (23) for guiding a seat-belt vertical adjustment element (24) on the vehicle seat portion (20) between an upper end position (OE) of the seat belt (30) and a lower end position (UE) of the seat belt (30). The cover (21) descends obliquely downwards to an outer edge (K) of the vehicle seat (10), at which edge (K) the vehicle seat portion (20) is present.

17 Claims, 5 Drawing Sheets

(56) References Cited

FOREIGN PATENT DOCUMENTS

| | | |
|---|---|---|
| DE | 10 2007 047 031 B3 | 1/2009 |
| EP | 0320739 | 6/1989 |
| GB | 2 367 040 A | 3/2002 |

* cited by examiner

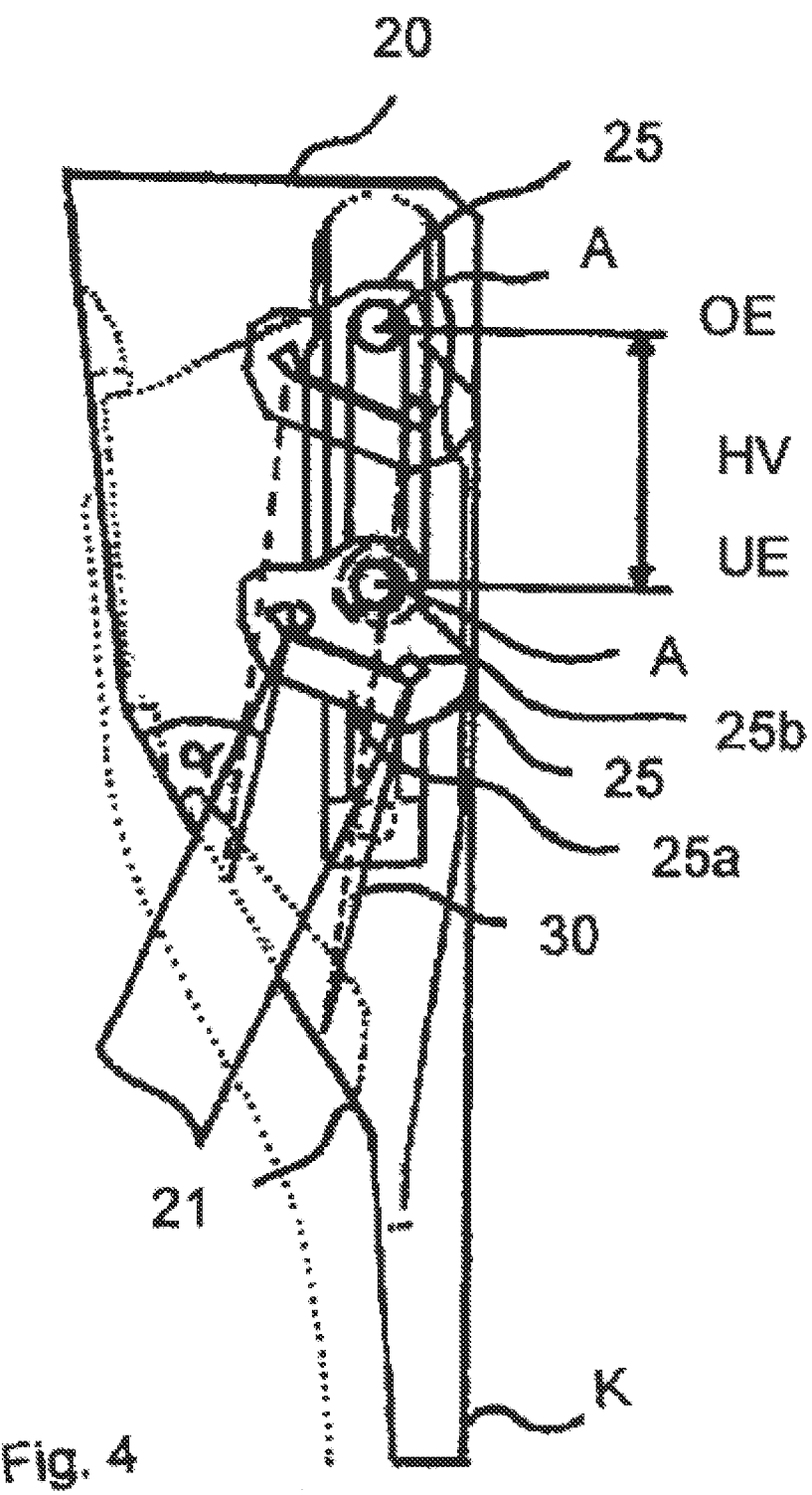

VEHICLE SEAT WITH A VERTICALLY ADJUSTABLE SEAT BELT

CROSS REFERENCE TO RELATED APPLICATIONS

This application claims the benefit of German Application No. 10 2009 037 994.0 filed Aug. 20, 2009, the entire contents of which is incorporated herein by reference.

The invention relates to a vehicle seat with a vertically adjustable seat belt.

DE 34 06 047 C2 describes a vertically adjustable end fitting or deflection fitting for a seat belt in motor vehicles with a fitting part which is guided so as to be displaceable in a guide rail fastened to the vehicle and acting as an abutment for said fitting part.

EP 0 320 739 B1 discloses a device for adjusting a belt-deflection fitting for a seat belt, in which the belt abutment conditions are adapted to the body size of the wearer of the belt in order to improve the action of the seat belt.

The seat belts described in these documents are fastened in each case to the B column of the vehicle. A fastening of the seat belt in this way is not very convenient for the occupant using the seat belt, in particular in the case of vehicles in which there is a great distance between the vehicle seat and a longitudinal column of the vehicle, for example in the case of lorries or also in the case of seats situated in the middle of the vehicle. In addition, a fastening of this type is not customary in sports seats.

Vehicle seats with integrated seat belts have therefore been designed, such as for example described in DE 103 02 942 A1 or DE 197 17 666 A1. The seat belts described in these documents, however, are not vertically adjustable and are therefore not capable of being adjusted to different body sizes of the occupants of the vehicle using the seat belt. As a result, there is not only a decrease in comfort on the vehicle seats with integrated seat belts but there is possibly a safety risk if the seat belt is not adjusted to the body size of the occupant of the vehicle using the seat belt.

FIG. 6 shows a part of a vehicle seat 100 with a vehicle seat portion 110 for receiving a vertically adjustable seat belt 120 according to the prior art. The seat belt 120 is rolled up in the vehicle seat portion 110 on a reel (not shown) which is arranged below a first opening 130. The first opening 130 is used for passing an end of the seat belt 120 out of the vehicle seat portion 110 to the outside onto the vehicle seat 100. The first opening 130 is arranged in a covering 140 on which a grip 150 is fastened by means of which the covering 140 and thus also the first opening 130 can be moved substantially vertically upwards and downwards with respect to the vehicle seat portion 110. This movement is illustrated in the form of an arrow in FIG. 6.

The covering 140 is used to cover a second opening 160 in the vehicle seat portion 110. The covering 140 is therefore dimensioned in such a way that the covering 140 always covers the second opening 160 both in the upper position of the handle 150 in the second opening 160 and in the lower position of the handle 150 in the second opening 160. For this reason the vehicle seat portion 110 must have both a free space 170 present above the second opening 160 and a free space 180 present below the second opening 160. As a result, the vehicle seat portion 110 has to have essentially larger dimensions than the distance which is formed between the upper and lower position of the handle 150 and which determines the maximum possible vertical adjustment of the seat belt 120. This means that a vertically adjustable seat belt 120 of this type has a comparative large space requirement. This is a drawback in the case of vehicle seats 100 which are intended to have a compact design.

In addition, there is the problem that, as the design of a vertically adjustable seat belt on a vehicle seat becomes more compact, the manipulation and ease of maintenance of the vertically adjustable seat belt can decrease.

The object of the invention is therefore to make available a vehicle seat with a vertically adjustable seat belt fastened thereto, in which both the comfort of the seat and the travelling safety of an occupant of the vehicle sitting on the vehicle seat are improved irrespective of his or her body size and the space requirement for the vertical adjustment mechanism is reduced, and at the same time the manipulation and ease of maintenance of the vertically adjustable seat belt are improved.

The object is attained by a vehicle seat with a vertically adjustable seat belt according to claim 1. In this case the seat belt is used to secure a user of the vehicle seat and the vehicle seat comprises a vehicle seat portion for receiving a first end of the seat belt. The vehicle seat portion comprises a cover which closes off the vehicle seat portion from the vehicle seat and behind which are provided a first slot opening for passing the seat belt out of the interior of the vehicle seat portion towards the exterior of the vehicle seat portion and a second slot opening for guiding a seat-belt vertical adjustment element on the vehicle seat portion between an upper end position of the seat belt and a lower end position of the seat belt. The cover descends obliquely downwards to an outer edge of the vehicle seat, at which edge the vehicle seat portion is present.

Advantageous arrangements of the vehicle seat are set out in the dependent claims.

It is advantageous if the first slot opening is arranged obliquely with respect to the second slot opening.

In addition, a plane in which the opening of the first slot opening 22 is arranged can be at a right angle to the plane in which the vehicle seat portion 20 extends.

Furthermore, it is possible for the seat belt to be guided out of the first slot opening obliquely to the outer edge of the vehicle seat.

It is advantageous for the vehicle seat portion additionally to have a pivoting element connected to the seat-belt vertical adjustment element for pivoting a part of the seat belt—leading from the pivoting element to the second end of the seat belt—about a pivot axle at a right angle to the length of the second slot opening. In this case the pivoting element can have a pivoting-element opening through which the seat belt is guided and which has an opening element which is shaped in a straight manner and over which the seat belt can slide. In this case the pivoting element can be mounted so as to be pivotable on the seat-belt vertical adjustment element by means of the pivot axle which is arranged at a distance from the opening element shaped in a straight manner and at a right angle to the latter.

It is also advantageous for the pivoting element to have a shape axially symmetrical with respect to the pivot axle.

In addition, the pivoting element can be pivotable by up to 180° about the pivot axle.

It is preferable for the seat-belt vertical adjustment element to be fastened to a sliding element which is wider than the width of the second slot opening and which is used for moving the seat-belt vertical adjustment element along the second slot opening. In this case the seat-belt vertical adjustment element can be fastened on the pivot axle of the pivoting element on the sliding element.

It is also possible for the seat-belt vertical adjustment element to be guided on the outside on the vehicle seat portion and for the sliding element on the inside on the vehicle seat portion.

It is also advantageous if the upper end position of the seat belt and the lower end position of the seat belt are at a distance of from 40 to 80 mm from each other.

As a result of the special arrangement of the vehicle seat described above, a convenient vertical adjustment of the seat belt present on it can be achieved, so that the seat belt can be worn and used conveniently by a multiplicity of users of the vehicle seat or occupants of the vehicle who have different body sixes. As a result, the travelling safety of an occupant of the vehicle sitting on the vehicle seat can be improved independently of his or her body size since the seat belt can be adjusted individually to the individual user of the vehicle seat or to the occupant of the vehicle.

In addition, by means of the oblique position of the cover it is possible to achieve the advantage that the uppermost point of the cover can act in practice as a stop for the lower end position of the seat belt and, on the other side of the seat belt, the seat belt is nevertheless still freely accessible for a human hand on account of the oblique position of the cover. In this way, the vertical adjustment of the seat belt can be carried out in a highly space-saving manner and, nevertheless, the manipulation and ease of maintenance of the vertically adjustable seat belt can be improved.

Furthermore, on account of the oblique position of the seat belt in the first slot opening an improved orientation of the seat belt with respect to the user of the vehicle seat can be achieved. Consequently, in accordance with a modification of this type, the seat belt is arranged even more ergonomically for the user of the vehicle seat.

The invention is described in greater detail below with reference to the accompanying drawing and by way of embodiments. In the drawing FIG. 1 is a view of a vehicle seat with a vertically adjustable seat belt according to an embodiment of the present invention;

FIG. 4 is a diagrammatic plan view of part of the vehicle seat portion in which the arrangement of the seat belt is illustrated both in the lower and in the upper vertical position for the purpose of illustration;

(Embodiment)

Figure 1:
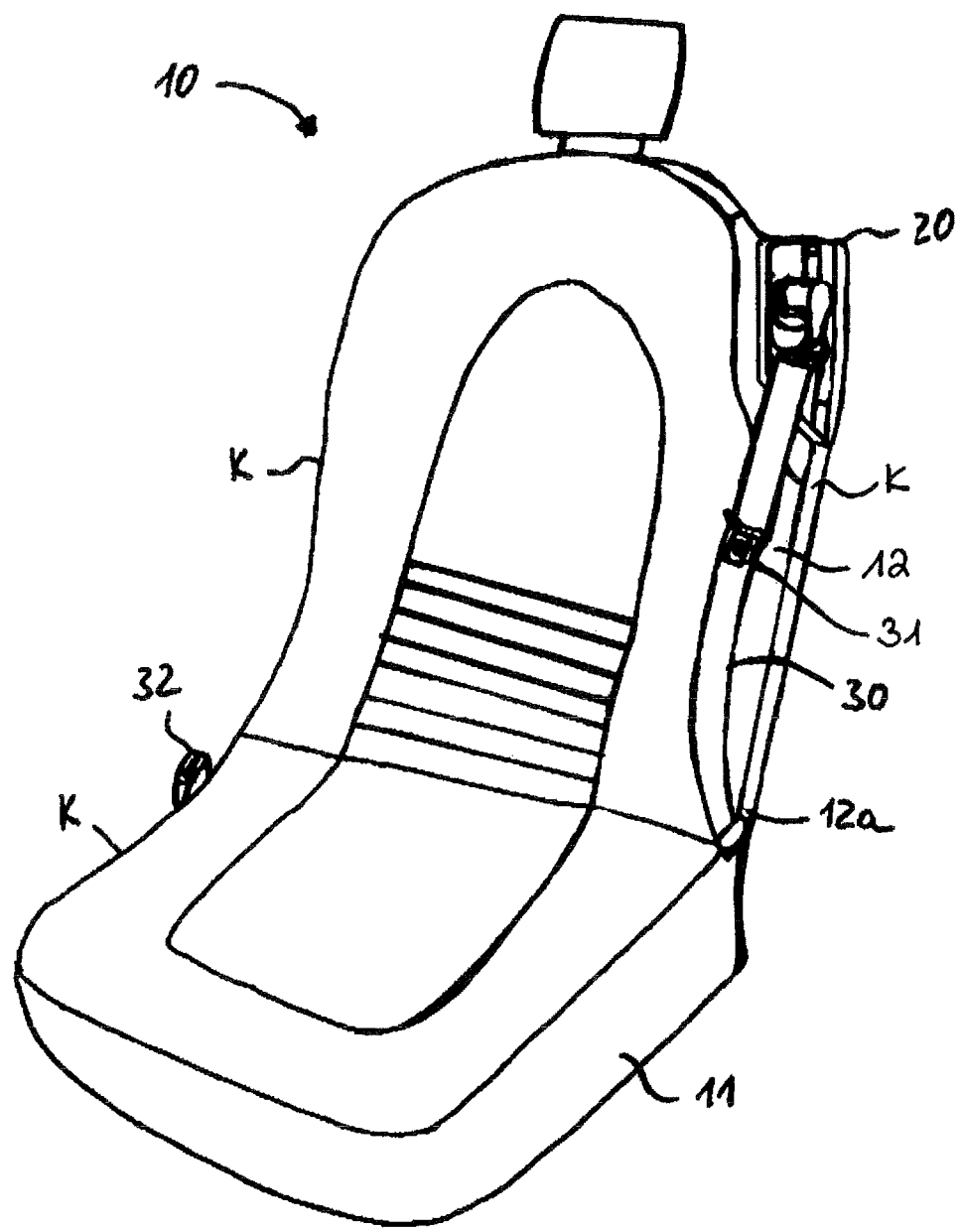

As shown in FIG. 1, a vehicle seat 10 has a seat 11 and a backrest 12 on which a vehicle seat portion 20 is situated at the side in the upper region. The seat 11 and the backrest 12 are upholstered in order to increase the seating comfort on the seat for a user of the vehicle seat 10.

A seat belt 30 is fastened on the vehicle seat portion 20 with its first end which is not visible in FIG. 1. The second end of the seat belt 30, on the other hand, is fastened in the lower region 12a of the backrest 12 on the same side of the backrest 12 as the vehicle seat portion 20. The second end of the seat belt 30 can also be mounted on the seat 11 or on the floor of the vehicle in which the vehicle seat 10 is mounted. Between the two ends of the seat belt 30 the seat belt 30 is rolled up onto a reel which is not shown in FIG. 1. The seat belt 30 can thus be extended by unrolling the reel. This is particularly necessary since a seat-belt plug-in device 31, which is attached to the seat belt 30 between its first and second end preferably so as to be displaceable, can be plugged into a seat-belt plug-in bush 32 on the other side of the vehicle seat 10, for example next to an outer edge K of the vehicle seat 10, by withdrawing the seat belt 30 from one of the fastening points thereof. In this way, a user of the vehicle seat 10, i.e. an occupant of the vehicle, can be securely belted on the vehicle seat 10.

The reel for rolling up the seat belt 30 can be situated either close to the first end or close to the second end of the seat belt 30. This means that the reel can be arranged for example in the vehicle seat portion 20 or in the lower portion 12a of the backrest 12.

Figure 2:
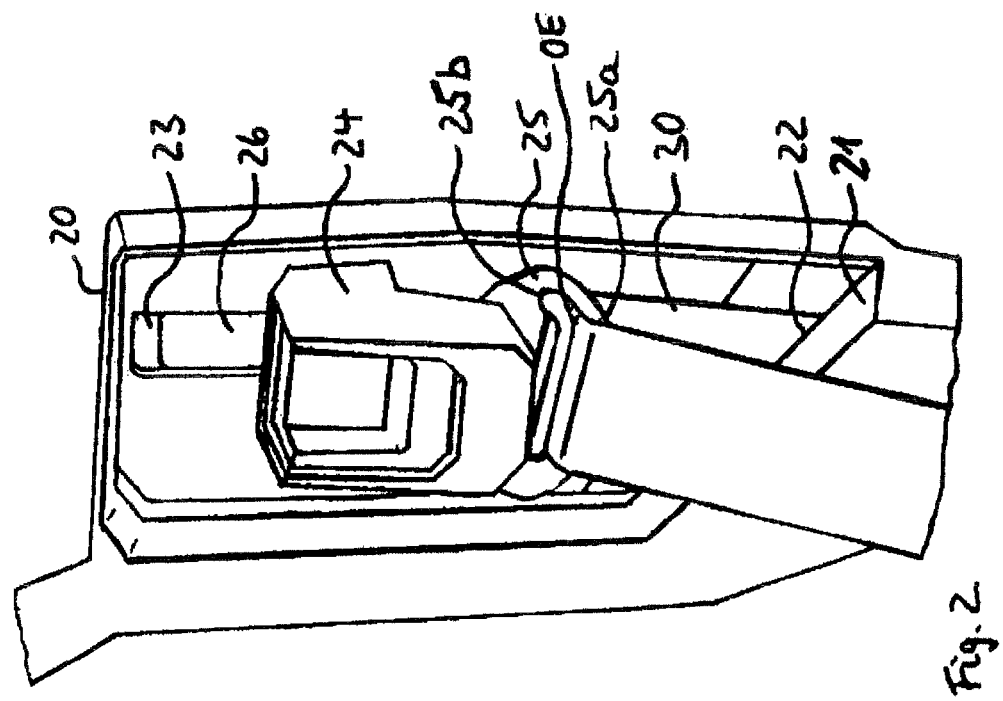
FIG. 2 is a diagrammatic, three-dimensional view of a portion of the vehicle seat shown in FIG. 1, in which the seat belt is in the upper vertical position.

FIG. 2 shows a detail of the vehicle seat portion 20 in FIG. 1. As may be seen in FIG. 2, the vehicle seat portion 20 has a cover 21 behind which a first slot opening 22 is arranged. In addition, the vehicle seat portion 20 has a second slot opening 23, a seat-belt vertical adjustment element 24, a pivoting element 25 and a covering of the second slot opening 23, which is referred to below as sliding element 26.

The cover 21 is mounted on the vehicle seat portion 20 and closes it off from the vehicle seat 10 and towards the front from the backrest 12 of the vehicle seat 10. In this way, the vehicle seat portion 20 is made slightly thinner with respect to the backrest 12 of the vehicle seat, i.e. as much thinner as the thickness of the cover 21 is selected. In this case the cover 21 and the vehicle seat portion 20 are designed in such a way that the first slot opening 22 is formed in the lower region of the cover 21 between the vehicle seat portion 20 and the cover 21. The first slot opening 22 has a width which corresponds to the thickness of the seat belt 30 and a length which corresponds to the width of the seat belt 30. This means that the first slot opening 22 is so wide and so long that the seat belt 30 can be pulled through it. As a result, the length of the first slot opening 22 is slightly longer than the seat belt 30 is wide and the width of the first slot opening 22 is slightly wider than the thickness of the seat belt 30.

As a result of the afore-mentioned arrangement of the cover 21, the vehicle seat portion 20 and the first slot opening 22, a plane in which the opening of the first slot opening 22 is situated is at a right angle to a plane in which the vehicle seat portion 20 extends and on which the cover 21 is mounted.

This means that the cover 21, and therefore also the first slot opening 22, is inclined with respect to one of the outer edges K of the vehicle seat 10. Expressed in greater detail, the first slot opening 21 is situated on a line which extends obliquely downwards to the outer edge K of the vehicle seat 10 or the vehicle seat portion 20, where the vehicle seat portion 20 is also arranged on the vehicle seat 10. The seat belt 30 is guided through the first slot opening 22 in such a way that it is guided outwards onto the vehicle seat portion 20 from its fastening point at its first end which is situated inside the vehicle seat portion 20 below the first slot opening 22 and is thus not visible.

In addition, the seat belt 30 is guided through the pivoting element 25. To this end the pivoting element 25 can be approximately in the shape of an oval belt ring which on a longitudinal side of the oval has a bulge in which the pivoting element 25 is fastened to its pivot axle A. The pivot axle A is shown in greater detail in FIG. 4 and FIG. 5.

As shown in FIG. 2, the seat belt 30 is guided through the oval belt ring and is placed around a belt-ring portion 25a which is straight at least locally and over which the seat belt 30 can slide. This means that the pivoting element 25 has an opening 25b through which the seat belt 30 is guided and which has an opening element 25a shaped straight at least locally or the belt-ring portion 25a by way of which the seat belt 30 can slide.

The pivoting element 25 is connected on a pivot axle A which is not visible in FIG. 2 to the seat-belt vertical adjustment element 24, so that the pivoting element 25 can be pivoted about this pivot axle A, this being described in more detail below.

Figure 3:
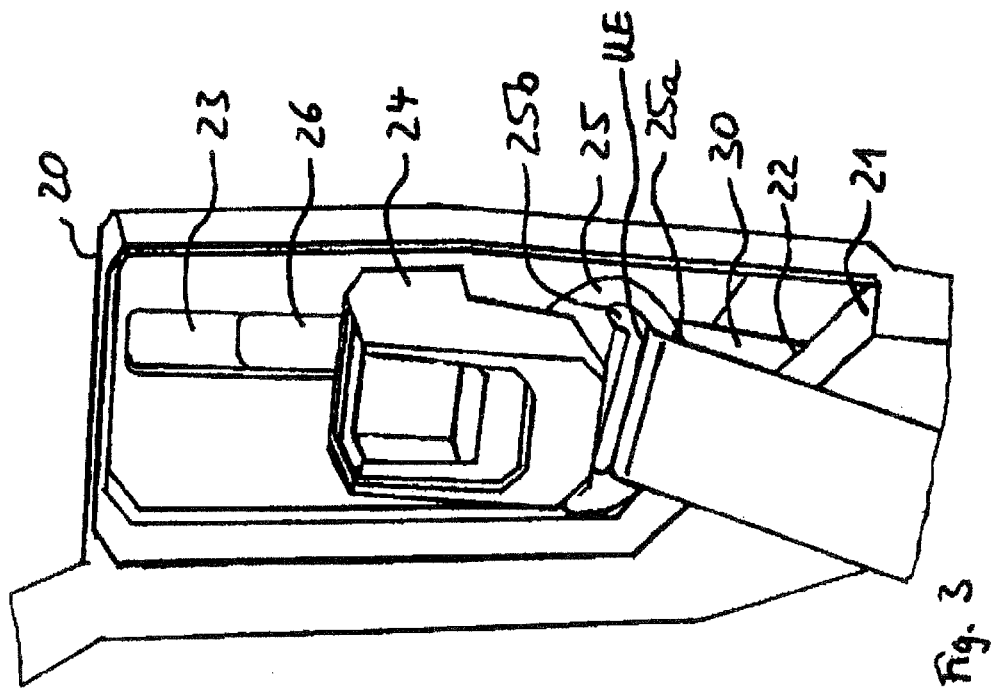
FIG. 3 is a diagrammatic, three-dimensional view of a portion of the vehicle seat shown in FIG. 1, in which the seat belt is in the lower vertical position.

The pivot axle A is mounted so as to be displaceable in the second slot opening 23. The second slot opening 23 is arranged substantially vertically in the vehicle seat portion 20 with respect to the backrest 12. Expressed in greater detail, the second slot opening 23 is a guide rail in which the seat-belt vertical adjustment element 24 is guided in such a way that it is displaceable at the top and bottom with respect to the backrest 12 of the vehicle seat 10. In this case, FIG. 2 shows an upper end position OE and FIG. 3 shows a lower end position UE. This means that the seat-belt vertical adjustment element 24 can be moved in or along the second slot opening 23 between a lower end position UE and an upper end position OE.

To this end the seat-belt vertical adjustment element 24 is fastened to the sliding element 26 through the second slot opening 23. The sliding element 26 is thus arranged behind the second slot opening 23 in the vehicle seat portion 20. The sliding element 26 has larger dimensions than the second slot opening 23, in such a way that it covers the second slot opening 23 at least completely at the side or only in part. In addition, the sliding element 26 preferably also has large dimensions in such a way that it covers the second slot opening 23 towards the top when the seat-belt vertical adjustment element 24 is moved into or arranged in the upper end position OE. In this way the sliding element together with the upper end of the vehicle seat portion 20 can also be used at the same time as a stop for the upper end position OE.

In contrast, the sliding element 26 covers the second slot opening 23 only partially, when the seat-belt vertical adjustment element 24 is pushed into or is situated in the lower end position OE. In order to prevent soiling of the interior of the vehicle seat portion 20, however, it is possible for the second slot opening 23 to have arranged behind it in the vehicle seat portion 20 a covering which is not illustrated here and which covers the second slot opening 23 towards the interior of the vehicle seat portion 20 but at the same time is arranged so far above the second slot opening 23 that a displacement of the seat-belt vertical adjustment element 24 in the second slot opening 23 together with the sliding element 26 is possible without difficulty.

Figure 6:
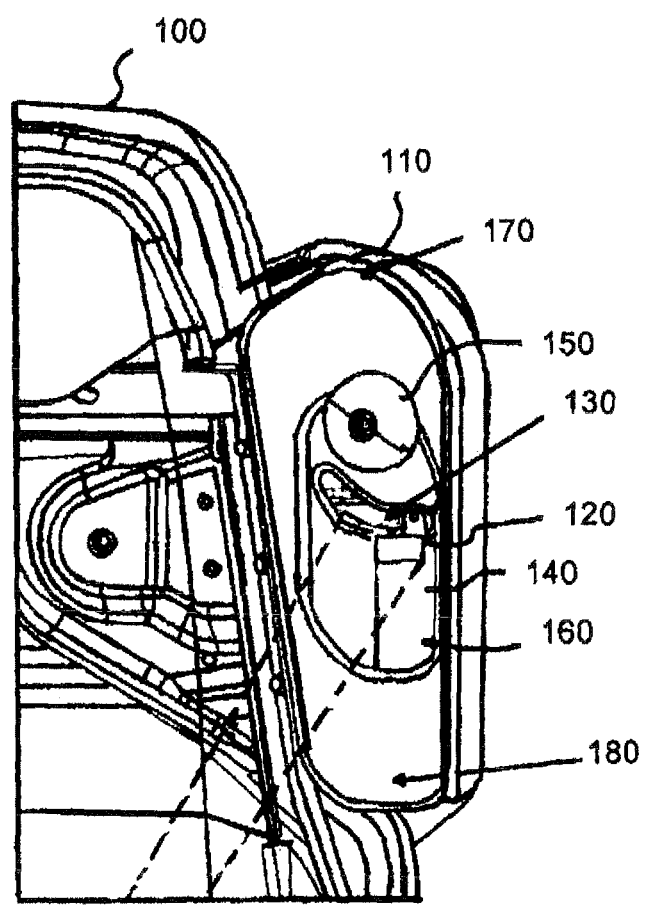
FIG. 6 is a plan view of a vehicle seat portion with a vertically adjustable seat belt according to the prior art.

As a result, as the seat belt 30 is adjusted vertically according to the invention on the vehicle seat 10 of the embodiment there is a smaller space requirement for the vertical adjustment of the seat belt 30 than in the case of the prior art shown in FIG. 6, since no free space for the sliding element is required below the seat-belt vertical adjustment element 24, as in the case of the prior art shown in FIG. 6.

The seat-belt vertical adjustment element 24 can be adjusted vertically in the second slot opening 23 continuously or with a plurality of steps. To this end, for example, the second slot opening 23 can be provided with various catch steps into which a catch element of the seat-belt vertical adjustment element 24 can engage. It is also possible, however, for the covering behind the sliding element 26 (as viewed from the plane of the drawing of FIG. 2 and FIG. 3) and for the sliding element 26 to be provided with a plurality of catch steps and a catch element capable of bring engaged therein. In addition, it is possible for a catch element of the seat-belt vertical adjustment element 24 to project through the sliding element 26 and thus to be able to engage in catch steps in the covering behind the sliding element 26.

Figure 5:
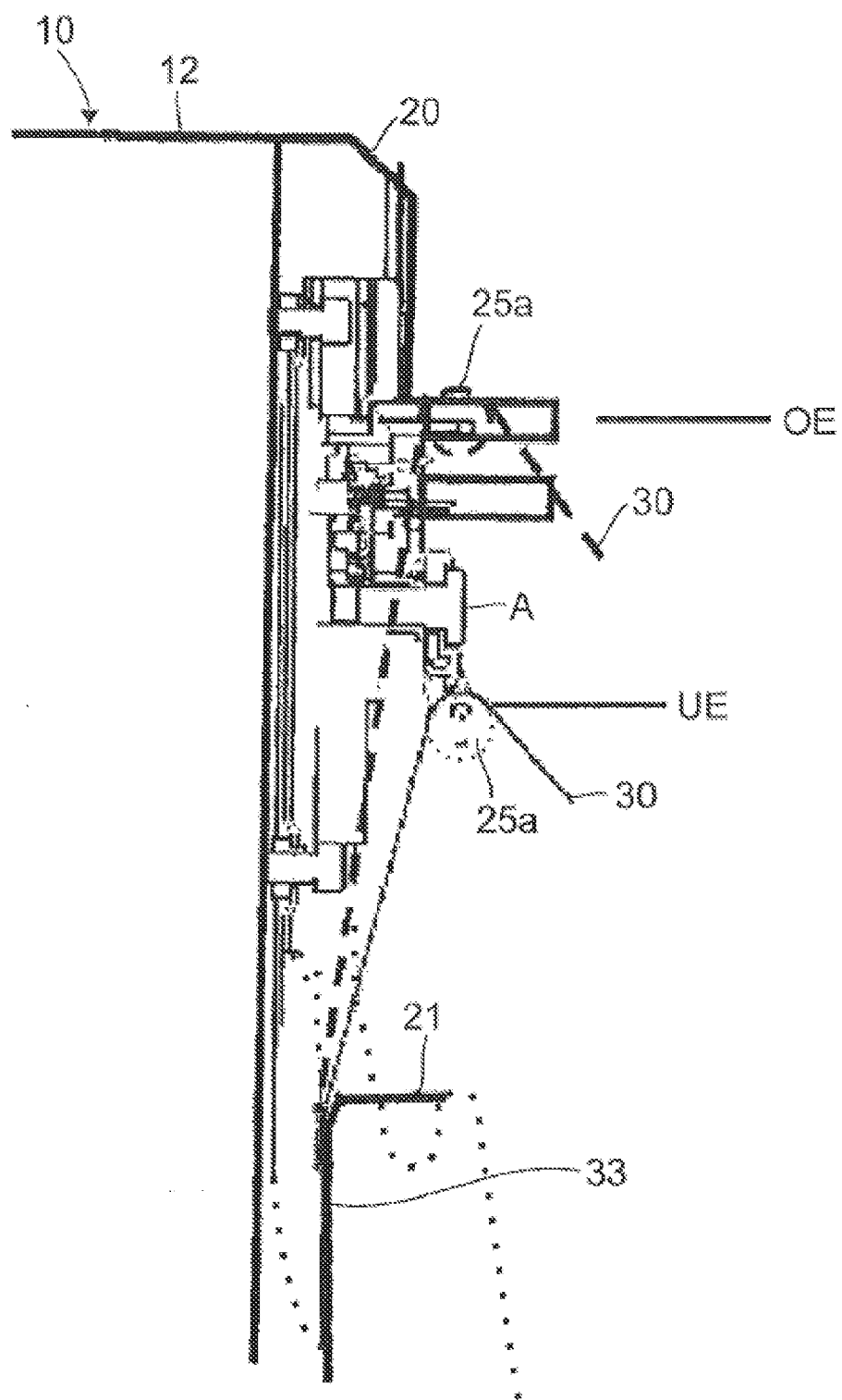
FIG. 5 is a diagrammatic cross-sectional view of the vehicle seat portion shown in FIG. 4.

In FIG. 4 and FIG. 5 the pivoting element 25 is shown for the purpose of better illustration both in the lower end position UE and in the upper end position OE. The seat belt 30 for the pivoting element 25 shown in the upper end position OE is indicated with a broken line in FIG. 4 and FIG. 5 in each case.

The distance between the lower end position UE and the upper end position OE or the vertical adjustment HV is dependent upon the space which is available for the second slot opening 23 on the backrest 12. Depending upon the shape of the vehicle seat 10, the size of the vertical adjustment HV can be selected relatively freely between the lower end position UE and the upper end position OE. For example, the vertical adjustment HV can amount to approximately 60 mm. It is preferable for the vertical adjustment HV to amount to approximately from 40 to 80 mm.

As shown in FIG. 4, in accordance with a modification of the present embodiment, the seat belt 30 can likewise be guided obliquely to the outer edge K of the vehicle seat 10 out of the first slot opening 22. This means that the seat belt 30 is guided obliquely to the obliquely arranged first slot opening 22 through said first slot opening 22. In this context "oblique" means an angle not equal to 90° or an angle α of up to 70° and preferably up to 50° between the first slot opening 22 and the seat belt 30.

As shown in FIG. 5, the seat belt 30 is fastened at its first end 33 behind the cover 21. In this case, therefore, the reel for winding up the seat belt 30 is arranged in the lower region 12a of the backrest 12. In this way, the vehicle seat portion 20 can also have a very flat design, and this is particularly advantageous if the depth of the backrest 12 of the vehicle seat 10 is not very great.

The pivot axle of the pivoting element 25, which is designated with the letter A in FIG. 4 and FIG. 5, is arranged substantially at a right angle to the second slot opening 23, so that the pivot axle A of the pivoting element 25 can project through the second slot opening 23. The pivoting element 25 is connected on the pivot axle A to the seat-belt vertical adjustment element 24, so that the pivoting element 25 can be pivoted about the pivot axle A. The pivot axle A is arranged at a right angle to the straight belt-ring portion 25a and is at a distance from it. In addition, the pivot axle A is arranged centrally to the length of the straight belt-ring portion 25a with respect to the dimensions of the oval belt ring of the pivoting element 25. This means that the pivoting element 25 is designed axially symmetrically to the pivot axle A.

As a result of this manner of arranging the seat belt 30 in the first slot opening 22 and in the pivoting element 25, the seat belt 30 can be reversed from the direction, in which it is moved out of the first slot opening 22 onto the vehicle seat portion 20, into a different direction, as desired by the user of the vehicle seat 10 and as required for him or her. The seat belt 30 can be pivoted up to approximately 180° about the pivot axle A by the pivoting element 25 illustrated in FIG. 2 to FIG. 5.

On account of the oblique position of the seat belt 30 with respect to the outer edge K of the vehicle seat 10, as shown in FIG. 4, the pivoting range of 180° of the pivoting element 25 about the pivot axle A can be aimed more in the direction of a user who can occupy the vehicle seat 10. With the modification of the previously illustrated embodiment of the vehicle seat with a vertically adjustable seat belt, a further vertical adjustment of the seat belt 30 to the various body sizes of the user of the vehicle seat 10 can be achieved as compared with the prior art of FIG. 6, even if the distance or the vertical adjustment HV between the lower end position UE and the upper end position OE of the seat-belt vertical adjustment element 24 in the second slot opening 23 is equal to the distance as shown in a vertical adjustment in accordance with the prior art of FIG. 6. The seat belt 30 according to the modification named is thus arranged in an even more ergonomic manner for the user of the vehicle seat 10.

Consequently, with a smaller space requirement for the vertical adjustment HV of the seat belt 30 on the vehicle seat 10 as a result of the special shape thereof with the second slot opening 23 and the pivoting element 25, the seating comfort and the travelling safety of a vehicle occupant sitting on the vehicle seat 10 is improved independently of his or her body size.

In addition, on account of the oblique position of the first cover 21 and the first slot opening 22, a particularly space-saving vertical adjustment mechanism, which at the same time is convenient to manipulate and easy to maintain, is made possible for the seat belt 30 of the vehicle seat 10.

(General)

All the arrangements of the vehicle seat 10 described above can be used individually or in all possible combinations. In this case the following modifications in particular are possible:

Even if the vehicle seat 10 was described above as an upholstered vehicle seat, it is not necessary for the vehicle seat 10 to be upholstered.

The vehicle seat portion 20, the seat-belt vertical adjustment element 24 and the pivoting element 25 can be produced from plastics. It is also possible for the elements to be produced from a metal. In both cases the elements can be lined or covered with a leather and/or fabric cover.

The seat-belt vertical adjustment element 24 is illustrated in FIG. 2 and FIG. 3 as a polygonal body in each case. However, the shape of the seat-belt vertical adjustment element 24 is not restricted to the shape shown in FIG. 2 and FIG. 3, but can be any desired one which meets the function of the seat-belt vertical adjustment element 24 as described above. The same also applies to the shape of the pivoting element 25, provided that the function of the pivoting element 25 as described above can be met with the shape thereof.

All the features disclosed in the application documents are claimed as being essential to the invention, insofar as they are novel either individually or in combination as compared with the prior art.

LIST OF REFERENCES 10 vehicle seat
11 seat
12 backrest
12a lower region of the backrest 12
20 vehicle seat portion
21 cover
22 first slot opening
23 second slot opening
24 seat-belt vertical adjustment element
25 pivoting element
25a straight belt-ring portion
25b pivoting-element opening
26 sliding element
30 seat belt
31 seat-belt plug-in device
32 seat-belt plug-in bush
33 first end of the seat belt 30
100 vehicle seat
110 vehicle seat portion
120 seat belt
130 first opening
140 covering
150 grip
160 second opening
170 free space
180 free space
α angle
A pivot axle
HV vertical adjustment
K outer edge of the vehicle seat 10
UE lower end position
OE upper end position

The invention claimed is:

1. A vehicle seat with a vertically adjustable seat belt in order to secure a user of the vehicle seat,
   wherein the vehicle seat comprises a vehicle seat portion for receiving a first end of the seat belt;
   wherein the vehicle seat portion comprises a cover which covers the vehicle seat portion towards the vehicle seat and behind which a first slot opening is provided for passing the seat belt out of the interior of the vehicle seat portion towards the exterior of the vehicle seat portion, wherein the first slot opening is formed between the vehicle seat portion and the cover, wherein the cover descends obliquely downwards at an outer edge of the vehicle seat at which an edge of the vehicle seat portion is present, and wherein the cover is mounted on the vehicle seat portion,
   a second slot opening for guiding a seat-belt vertical adjustment element on the vehicle seat portion between an upper end position of the seat belt and a lower end position of the seat belt, wherein the seat belt vertical adjustment element is fastened to a sliding element through the second slot opening; and
   a pivoting element connected to the seat belt vertical adjustment element for pivoting part of the seat belt about a pivot axle, wherein the pivot axle is arranged substantially at a right angle to the second slot opening and displaceable in the second slot opening and wherein the pivoting element pivots about the pivot axle.

2. A vehicle seat according to claim 1, wherein the first slot opening is arranged obliquely with respect to the second slot opening.

3. A vehicle seat according to claim 1, wherein a plane in which the opening of the first slot opening is arranged is at a right angle to a plane formed by the direction in which the seat belt extends within the interior of the vehicle seat.

4. A vehicle seat according to claim 1, wherein the seat belt is guided out of the first slot opening obliquely to the outer edge of the vehicle seat.

5. A vehicle seat according to claim 1, wherein the pivoting element has a pivoting-element opening through which the seat belt is guided and which has an opening element which is shaped in a straight manner and over which the seat belt can slide.

6. A vehicle seat according to claim 5, wherein the pivoting element is mounted so as to be pivotable on the seat belt vertical adjustment element by means of the pivot axle which is arranged at a distance from the opening element shaped in a straight manner and at a right angle to the latter.

7. A vehicle seat according to claim 1, wherein the pivoting element has a shape axially symmetrical with respect to the pivot axle.

8. A vehicle seat according to claim 1, wherein the pivoting element is pivotable up to 180° about the pivot axle.

9. A vehicle seat according to claim 1, wherein the seat belt vertical adjustment element is fastened to a sliding element which is wider than the width of the second slot opening and which is used for moving the seat belt vertical adjustment element along the second slot opening.

10. A vehicle seat according to claim 9, wherein the seat belt vertical adjustment element is fastened on the pivot axle of the pivoting element on the sliding element.

11. A vehicle seat according to claim 9, wherein the seat belt vertical adjustment element is guided on the outside on the vehicle seat and the sliding element is guided on the inside on the vehicle seat.

12. A vehicle seat according to claim 1, wherein the upper end position of the seat belt and the lower end position of the seat belt are at a distance of from 40 to 80 mm from each other.

13. A vehicle seat according to claim 1, wherein the seat belt vertical adjustment element is fastened to a sliding element which is wider than the width of the second slot opening and which is used for moving the seat belt vertical adjustment element along the second slot opening.

14. A vehicle seat according to claim 10, wherein the seat belt vertical adjustment element is guided on the outside on the vehicle seat and the sliding element is guided on the inside on the vehicle seat.

15. A vehicle seat according to claim 1, wherein the second slot is disposed below the first slot.

16. A vehicle seat according to claim 1, wherein the sliding element is arranged behind the second slot opening in the vehicle seat portion, the sliding element covering at least a portion of the second slot opening.

17. A vehicle seat according to claim 1, wherein the sliding element and an upper end of the vehicle seat portion provide a stop for the upper end portion.

* * * * *